UNITED STATES PATENT OFFICE.

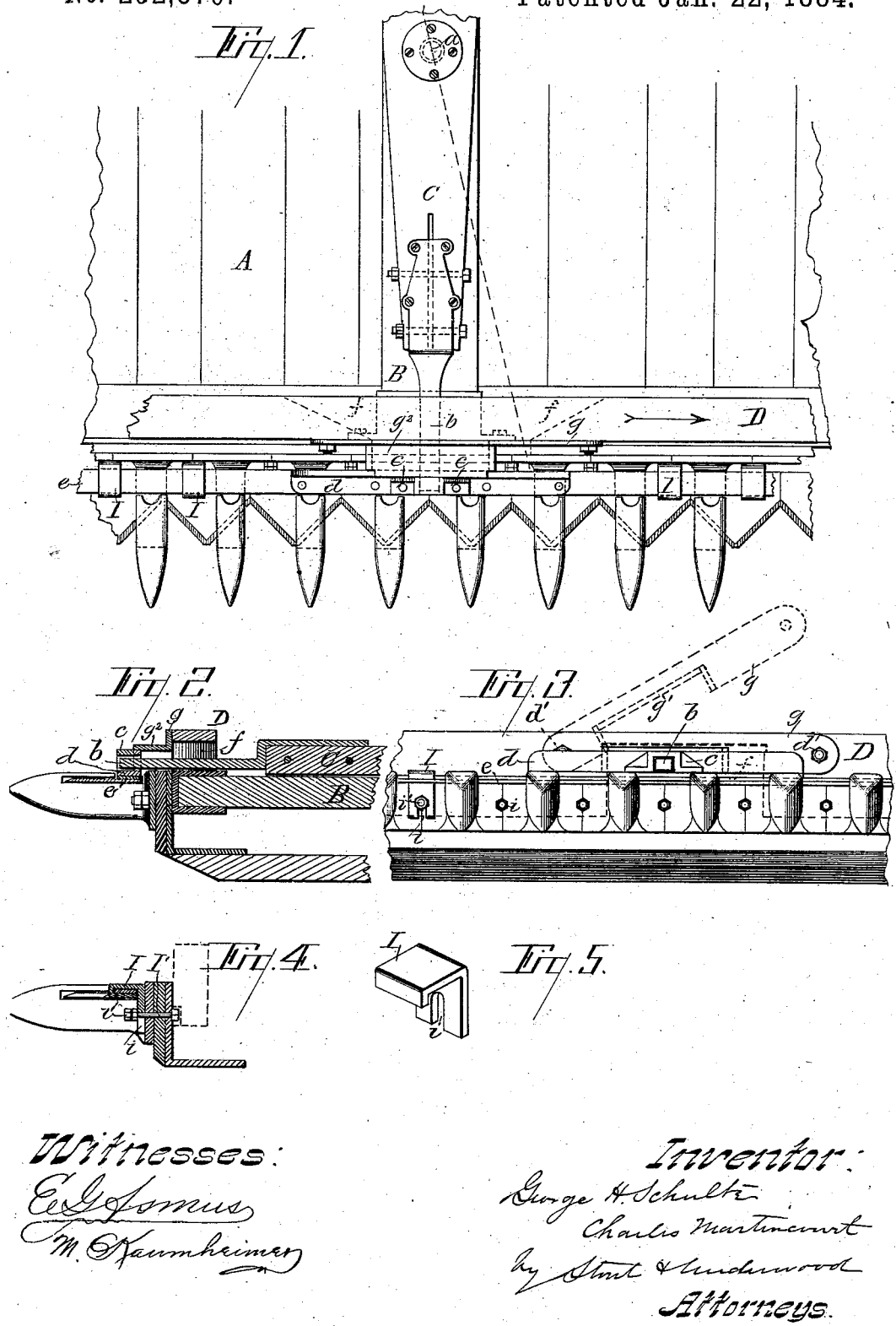

GEORGE H. SCHULTE AND CHARLES MARTINCOURT, OF MILWAUKEE, WISCONSIN, ASSIGNORS TO THE DENNETT HARVESTING MACHINE COMPANY, (LIMITED,) OF SAME PLACE.

CUTTING APPARATUS FOR HARVESTERS.

SPECIFICATION forming part of Letters Patent No. 292,370, dated January 22, 1884.

Application filed October 4, 1883. (No model.)

*To all whom it may concern:*

Be it known that we, GEORGE H. SCHULTE and CHARLES MARTINCOURT, both of Milwaukee, in the county of Milwaukee, and in the State of Wisconsin, have invented certain new and useful Improvements in Cutting Apparatus for Harvesters; and we do hereby declare that the following is a full, clear, and exact description thereof.

Our invention relates to improvements in cutting apparatus for harvesters, and will be fully described hereinafter.

In the drawings, Figure 1 is a top view of part of a grain-platform with our improvements. Fig. 2 is a vertical section of same through the center of the sway-bar. Fig. 3 is a front elevation of same, and Figs. 4 and 5 show details of the invention.

A is the platform of a machine embodying our invention. B is its center brace, and C is the sway-bar, which is pivoted to said brace at *a*. The sway-bar C is connected at its rear end with the driving mechanism, while its front end has a nose, *b*, that projects through a slot, *f*, in the stretcher-bar D, into a keeper, *c*, that is bolted to an angle-iron, *d*, on the sickle-bar *e*. The slot *f* in the stretcher-bar D is made long enough to permit the sway-bar C to swing far enough in the direction of the arrow, Fig. 1, to cause its nose *b* to clear the keeper *c* when it is desired to remove either the sway-bar or sickle-bar after the opposite end of the sway-bar has been detached from the driving mechanism; and to cover this gap in the stretcher-bar, so as to prevent grain and other clogging matter from getting under the apron, we provide a gate, *g*, which has a housing, *g'*, that is just long enough to permit the necessary play of the sway-bar as it reciprocates the sickle-bar, and from the top of this housing a flange, *g²*, projects out over the vertical flange of the angle-iron *d*, so that while the gate *g* covers the slot *f* in stretcher-bar D, the angle-iron *d* closes the front of the housing, and the entrance of the grass or grain at these points is entirely prevented. Now, when the sickle is to be removed, one of the bolts *d'* is taken out, the gate *g* elevated, as shown in Fig. 3, the clamp I removed, and the rear end of the sway-bar detached from the driving mechanism. The sickle may now be drawn out of its bearings in the direction of the arrow, leaving the sway-bar free, so that it also can be taken off of the machine without removing the stretcher-bar; and to further facilitate the removing of the sickle, I provide the long vertical portion of each clamp I with a slot, *i*, that permits it to straddle its securing-bolt I', so that after its nut *i'* has been loosened, it (the clamp) may be lifted off the bolt while the latter remains in place; and we deem this an important feature of our invention, for hitherto it has been necessary to entirely remove the bolt in order to release the clamp, and as this also involved the removal of the stretcher-bar it required both time and labor.

Having thus described our invention, what we claim as new, and desire to secure by Letters Patent, is—

1. In a harvester, the combination of the platform, the apron stretcher-bar provided with a horizontal slot, the cutter-bar, the angle-iron shield secured to said cutter-bar, the keeper, also secured to said cutter-bar, the central sway-bar passing through the slot in the stretcher-bar and engaging said keeper, and the flanged shield overlapping said angle-iron shield and covering said slot, as and for the purpose set forth.

2. In a harvester, the cutter-bar *e*, having the angle-iron shield *d* and keeper *c*, in combination with the bar B, sway-bar C, and pivot *a*, substantially as and for the purpose set forth.

3. In a harvester, the cutter-bar *e*, having the angle-iron shield *d* and keeper *c*, in combination with the sway-bar C, the front stretcher-bar, D, having the slot *f*, and the upper shield, *g*, substantially as and for the purpose set forth.

4. In a harvester, the combination of the finger-bar, the sickle, the removable clamps having slots, and the bolts passing through said slots for securing said clamps in place, substantially as set forth.

5. In a harvester, the sickle-clamps I, having slots $i$, in combination with the bolts I' and nuts $i'$, substantially as and for the purpose set forth.

In testimony that we claim the foregoing we have hereunto set our hands, at Milwaukee, in the county of Milwaukee and State of Wisconsin, in the presence of two witnesses.

GEORGE H. SCHULTE.
CHARLES MARTINCOURT.

Witnesses:
STANLEY S. STOUT,
M. KAUMHEIMER.